United States Patent [19]

Skurka et al.

[11] Patent Number: 5,192,252
[45] Date of Patent: Mar. 9, 1993

[54] ROLLER CHAIN WITH RANDOMIZED PITCH

[75] Inventors: John C. Skurka, Ithaca; Francis J. Hunter, Rochester, both of N.Y.

[73] Assignee: Borg-Warner Automotive Transmission & Engine Components Corporation, Sterling Heights, Del.

[21] Appl. No.: 776,994

[22] Filed: Oct. 16, 1991

[51] Int. Cl.⁵ .............................................. F16G 13/10
[52] U.S. Cl. .................................... 474/210; 474/231
[58] Field of Search ................................ 474/206–208, 474/212–217, 226, 228–231, 210

[56] References Cited

U.S. PATENT DOCUMENTS

| | | |
|---|---|---|
| 697,190 | 4/1902 | Aultman ............................ 474/228 |
| 2,142,003 | 12/1938 | Morgelin ........................ 474/231 X |
| 3,313,578 | 4/1967 | Wright et al. ................... 474/214 X |
| 3,931,706 | 1/1976 | McKeon et al. |
| 4,117,738 | 10/1978 | McKeon |
| 4,186,617 | 2/1980 | Avramidis |
| 4,315,750 | 2/1982 | Kawashima et al. |
| 4,344,761 | 8/1982 | Steuer |
| 4,650,445 | 3/1987 | Mott |
| 5,092,822 | 3/1992 | Wakabayashi ...................... 474/209 |

FOREIGN PATENT DOCUMENTS

| | | | |
|---|---|---|---|
| 535636 | 5/1921 | France ............................. 474/231 |
| 14291 | of 1909 | United Kingdom ................ 474/207 |
| 1158340 | 11/1963 | ........................................ 474/207 |

*Primary Examiner*—Ramon S. Britts
*Assistant Examiner*—Roger J. Schoeppel
*Attorney, Agent, or Firm*—Willian Brinks Olds Hofer Gilson & Lione

[57] ABSTRACT

A roller chain is provided with sets of links constructed of unequal pitch in order to alter the pattern of contacts between the chain and the sprocket and the resulting noise spectrum. The varying pitch lengths through the chain are achieved by varying the length of the inside links or the lengths of the outside links. Alternatively, the sizes and configurations of the rollers or bushings are varied. Configurations can include circular rollers, elliptical rollers or triangular rollers. The pattern of variation of the pitch of the links is randomized throughout the chain.

26 Claims, 2 Drawing Sheets

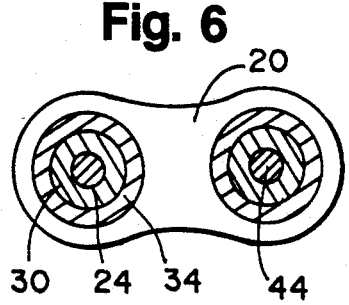
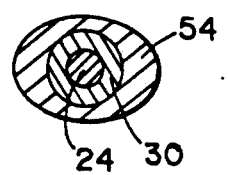
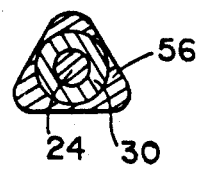
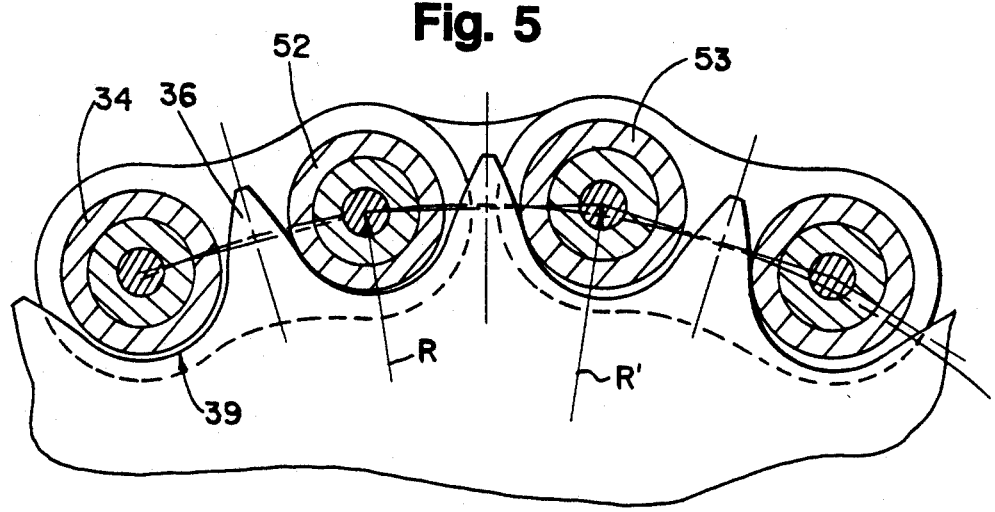
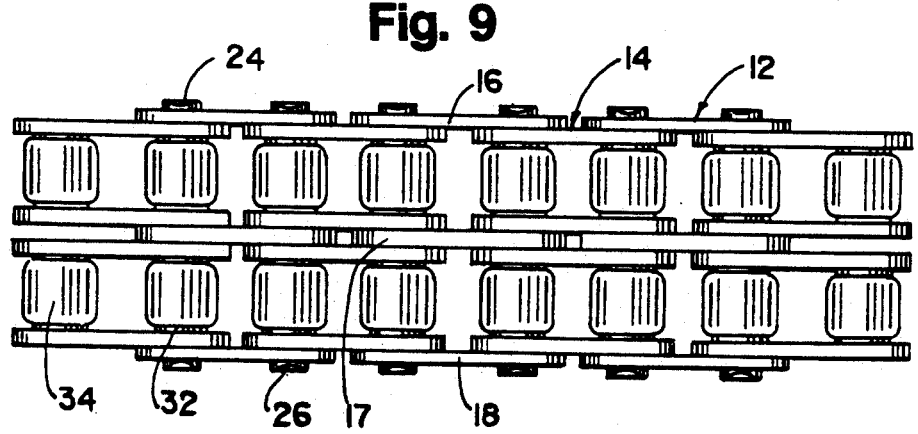

ROLLER CHAIN WITH RANDOMIZED PITCH

BACKGROUND OF THE INVENTION

1. Field of the Invention

The present invention relates generally to power transmission chains. More particularly, the present invention relates to a chain constructed with unequal pitch lengths which are randomized throughout the chain. The invention has particular application to power transmission chains of the roller chain variety, which are used in engine timing applications as well as industrial applications.

2. Description of the Prior Art

Power transmission chains are widely used in the automotive industry. Such chains are used for engine timing drives as well as for the transfer of power from the engine to the transmission or for the transfer of power in a transfer case. Power transmission chains are also widely used in industrial applications.

One type of power transmission chain is referred to as "silent chain". Such chain is formed of interleaved sets of inverted tooth links. A set or rank of links is assembled from several links positioned alongside of or adjacent to each other. The links are connected by pivot means, which are typically round pins received in a pair of apertures. An example of silent chain is found in U.S. Pat. No. 4,342,560, which is incorporated herein by reference.

A second type of chain is know as "roller chain". A typical roller chain consists of alternate inner links and outer links. The inner links, which are also known as "bushing" links, consist of spaced sidebars with bushings tightly received in openings, or apertures, at each end of the sidebars. The outer links, which are also known as "pin" links or guide links, consist of spaced sidebars with pins tightly received in openings, or apertures, at each end of the sidebars. The bushings freely rotate about the pins to pivotally connect the outer links to the inner links in alternate arrangement. Rollers are provided on the bushings, and when the roller chain is wrapped about a sprocket, the teeth of the sprocket are received between the laterally spaced sidebars and the longitudinally spaced rollers. An example of roller chain is found in U.S. Pat. No. 4,186,617, which is incorporated herein by reference.

Roller chain drives can include both "true roller" and rollerless design. The true roller design includes the described rollers mounted about the bushings. Rollerless chain contains bushings that directly contact the sprocket teeth. Both types of roller chain are typically specified in industry as British Standard chain and American National Standards Institute (ANSI) chain.

A conventional power transmission drive is comprised of either a silent chain or a roller chain wrapped about at least two sprockets supported by shafts. The chain is endless and assembled from interconnected links that are adaptable to fit over and about teeth formed on the sprockets. Movement of a driving sprocket causes power transmission through the chain and consequent movement of a driven sprocket. In an engine timing drive application, the driving sprocket may be mounted on the engine crankshaft and the driven sprocket mounted on a valve camshaft. The rotation of the camshaft is thus controlled by the rotation of the crankshaft through the chain.

Noise is associated with such chain drives. Noise is generated by a variety of sources, but in roller chain drives it can be caused by the impact sound generated by the collision of the rollers and the sprocket at the onset of meshing. The loudness of the impact sound is affected by, among other things, the impact velocity between the chain and the sprocket.

The meshing impact sound is generally a periodic sound in chain drives. The impact sound is repeated with a frequency approximately equal to that of the frequency of the chain meshing with the sprocket. The frequency can be related to the number of teeth on the sprocket and the speed of the sprocket. Noise may also be caused, in part, when successive rollers engage the sprocket teeth and then gradually roll or slide into their final positions at the root diameter of the sprocket.

Many efforts have been made to decrease the noise level and pitch frequency distribution in chain drives of both the silent chain and the roller chain variety. The problem of noise reduction in silent chain drives was addressed in U.S. Pat. No. 4,342,560 by changing the contacts between the link flanks of a silent chain and the sprockets by having differently configured link flanks in different sets of the chain. By mixing of links of differing flank configuration, U.S. Pat. No. 4,342,560 attempted to modify the pattern of sound emanating from the chain contacting the sprocket by altering the types of link configurations and thus altering the point and rhythm of contacts. The sets of links of different configurations are placed in random patterns throughout the length of the chain. The resulting chain is often referred to as "hybrid" chain or "random" chain.

Other attempts to alter the rhythm of contacts between the silent chain drive and the sprocket taught the modification of the sprocket teeth. For example, U.S. Pat. No. 3,377,875 and U.S. Pat. No. 3,495,468, teach relief of sprocket teeth in order to achieve noise reduction in contacts between the silent chain and the sprocket.

In the area of side-bar chains for cone pulley transmissions, U.S. Pat. No. 4,344,761 describes a side-bar chain construction which is designed to prevent sympathetic vibrations between the chain and the cone pulleys. The patent teaches causing the lengths of selected links between associated articulation points to differ from those of the remaining links. U.S. Pat. No. 4,650,445 discusses various other methods of construction of silent chains and chain-belts for variable pulley transmissions that are attempts to modify the generated noise pattern.

The present invention utilizes these generic concepts of noise reduction in a roller chain. The present invention seeks to provide a roller chain construction that modifies the pattern of chain and sprocket contacts through the use of unequal pitch lengths in the chain. These unequal pitch lengths are achieved through the use of varying link lengths; rollers and bushings of differing sizes and configurations; and varying sprocket tooth spacing.

SUMMARY OF THE INVENTION

In accordance with one embodiment of this invention, a roller chain is provided with sets of links constructed of unequal pitch. The pitch length of a conventional roller chain is generally measured by the distance between the centers of the pins of adjacent rollers along the pitch circle of the chain. The pitch of the chain is generally matched to the pitch of the associated sprockets.

In order to modify the pattern of contacts between the chain and the sprocket, the pitch lengths of selected links of the chain of the present invention are altered throughout the length of the chain. Thus, some links of the chain have a first pitch length and other links of the chain have a second, or different, pitch length. Additional pitch lengths may also be included in the chain.

The varying pitch lengths through the chain are achieved in a number of ways. For example, the length of the inside links and the outside links can be varied through the chain. That is, some inside links can be longer than other inside links, as well as some outside links can be longer than other outside links. Alternatively, the sizes and configurations of the rollers or bushings can be varied. Configurations can include circular rollers, elliptical rollers or triangular rollers. Varying the size or configuration of the rollers changes the effective distance, or the effective pitch, between the rollers as the rollers seat on the sprocket. The pitch length can also be varied by altering the distance between the pins in the links.

The variation of the links can be "randomized" throughout the chain. For example, a short pitch link can be followed by a short pitch link, then a long pitch link, then two short pitch links, then a long pitch link. This "pattern" of randomization can be optimized in order to find the pattern with the lowest noise spectrum.

Another manner of randomization of the links can involve altering the initial point of engagement of the sprocket tooth and roller as well the final seated position of the roller on the sprocket tooth. Such randomization would alter the spacing and time between successive sprocket tooth and roller contacts.

Thus, in one embodiment of the present invention, a roller chain is provided for use with a sprocket. The chain is comprised of a series of interleaved inner links and outer links. Each outer link has a pair of outer link plates fixedly mounted to spaced pin members. Each inner link has a pair of bushings mounted to turn on the pins of the outer links. The inner links each have inner link plates fixedly mounted to the bushings. Each bushing includes a roller freely mounted thereon to contact the teeth of the sprocket. Each of the inner links and outer links is adapted to receive a sprocket tooth between them.

Randomization is achieved by having some of the links with a pitch length of a first distance and others of the links having a pitch length of a different distance. Differing pitch lengths can be achieved by having inner link plates of differing lengths. Likewise, randomization can be achieved by having outer link plates of differing lengths.

The chain can also be constructed with pin members spaced apart by differing distances, or with the pin members constructed of different diameters.

Use of a roller chain constructed in accordance with the teachings of this invention with a sprocket results in the generation of a noise pattern that is modified in comparison with the noise pattern generated by a chain and sprocket in which all the links are of identical pitch length. The construction of differing pitch lengths modifies the pattern of contacts between the roller chain and the sprocket. The chain of this invention is suitable for use with a variety of sprocket tooth forms, including sprockets with dual teeth.

BRIEF DESCRIPTION OF THE DRAWINGS

For a more complete understanding of the invention, one should refer to the embodiments illustrated in greater detail in the accompanying drawings and described below by way of examples of the invention. In, the drawings, which are not to scale:

FIG. 5 is a side view of a portion of the chain of the present invention mounted on a sprocket, with portions broken away, illustrating the difference in seating of rollers of differing diameters;

FIG. 6 is a side view of a link of the chain of the present invention, with the rollers and bushings and pins shown in section;

FIG. 7 is a side view of the link of FIG. 6, with the roller of elliptical configuration;

FIG. 8 is a side view of the link of FIG. 6, with the roller of triangular configuration; and, FIG. 9 is a plan view of an alternative embodiment of the present invention in a double chain.

DETAILED DESCRIPTION OF THE DRAWINGS

Figure 1:
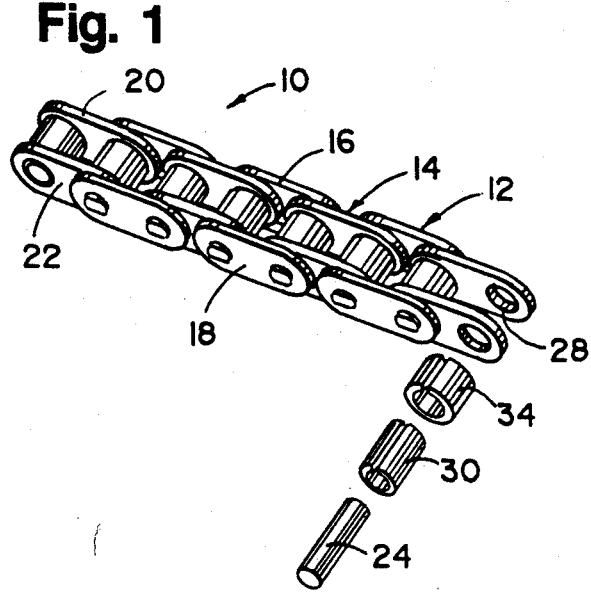
FIG. 1 is a perspective view of one embodiment of the chain of the present invention, shown partly in exploded view.
Figure 3:
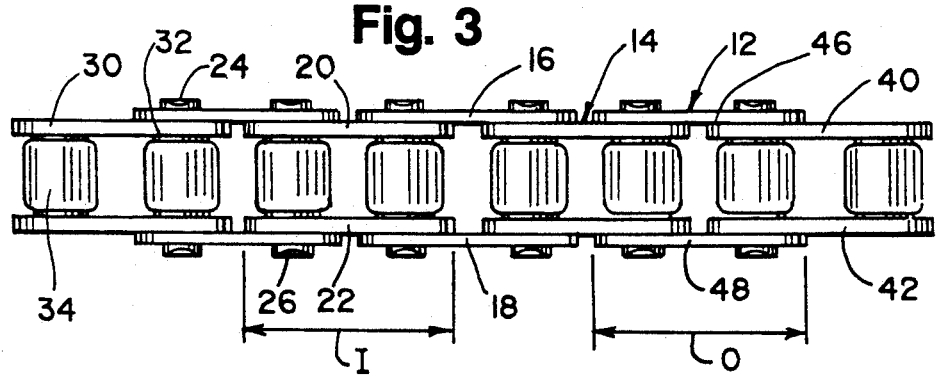
FIG. 3 is a plan view of the chain of the present invention.

Turning now to the drawings, FIGS. 1 illustrates a portion of the chain of the present invention generally at 10. The chain is constructed by a series of links, pins, bushings and rollers. The chain includes a series of interleaved outer links 12 and inner links 14, which are also shown in FIG. 3. The outer links are formed by a pair of outer link plates 16, 18, or sidebars. The inner links are likewise formed by a pair of inner link plates 20, 22.

Figure 4:
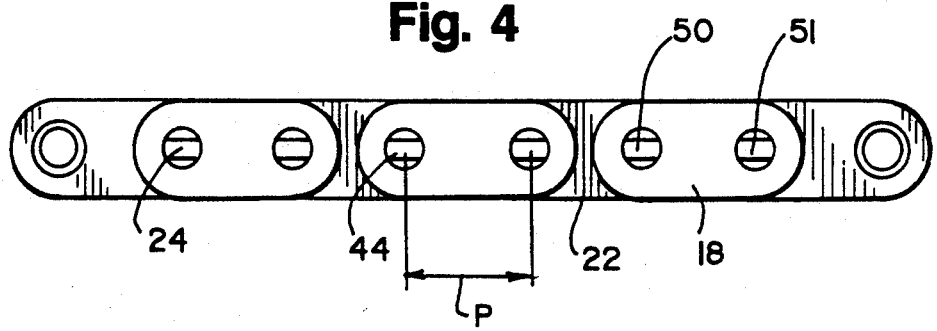
FIG. 4 is a side view of the chain of FIG. 3.

The outer link plates 16, 18 are fixed to a pair of pins 24, 26. The pins are generally cylindrical in shape and spaced apart and fitted through apertures 28 in the outer link plates. The pins are secured in the outer link plates by a press fit, or welding, caulking or any other means known in the art. The distance between the pins of a conventional roller chain is the pitch of the chain. That distance is designated by the letter P in FIG. 4.

The outer link plates have a length designated by the letter 0 in FIG. 3, while the inner link plates have a length designated by the letter I in FIG. 3. The inner link plates 20, 22 are fixed to a pair of bushings 30, 32. The bushings are generally cylindrical in shape and spaced apart and fitted through apertures 28 in the inner link plates. The bushings are secured in the inner link plates by a press fit, or by welding, caulking or any other means known in the art.

The bushings are mounted about the pins and are freely rotatable about the pins. Thus, rotation of the bushings about the pins allows pivoting of the outer links with respect to the inner links. In the chain shown in FIG. 1, rollers 34 are mounted about the bushings and are freely rotatable about the pins. The rollers are also generally cylindrical in shape.

Figure 2:
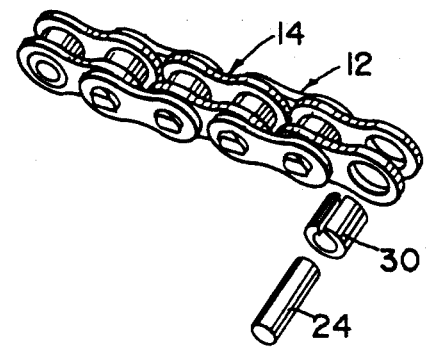
FIG. 2 is a perspective view of an alternative embodiment of the chain of the present invention, shown partly in exploded view.

Thus, the chain of FIG. 1 is constructed by inserting the pin within the bushing and the bushing within the roller. The bushings and rollers are generally formed with a split ring, as shown in FIGS. 1 and 2. The bushings are secured to a pair of inner link plates and the pins are then secured to a pair of outer link plates. The inner links and outer links are alternated in series to form an endless chain. The length of the chain and exact number of inner and outer links is determined by, among other things, the application and ratio and center distance between the sprockets.

As shown in FIG. 5, the rollers of the chain contact the teeth 36 of the sprocket 38. The rollers seat in the root 39 between the sprocket teeth 36. The outer links and inner links are constructed so that the teeth of the sprocket can be received between the link plates and between the rollers.

The chain drive system typically includes a driving sprocket and a driven sprocket (not shown) and the endless chain interconnecting the sprockets. In an engine timing drive, the system can include an idler sprocket or a two driving sprockets on a crankshaft being interconnected by two separate endless chains with two driven sprockets on separate camshafts. Movement of the driving sprocket transfers power, or causes movement of the driven sprocket, through movement of the chain.

The chain of the present invention includes links of unequal pitch length in order to modify the pattern of contacts between the chain and the sprocket. Unequal pitch lengths may be accomplished by unequal lengths of the links. For example, as shown in FIG. 3, inner link plates 20, 22, are constructed of a different length than inner link plates 40, 42. Thus, the length I of the inner links varies along the chain. Similarly, outer link plates 16, 18 are constructed of a different length than outer link plates 46, 48. In this manner, the length 0 of the outer links varies along the chain.

Various patterns of the variation in lengths of links can be constructed throughout the entire chain. For example, short links can be followed by long links and vice versa. Alternatively, short links can be followed by short links and then one or two long links and then another short link. In this manner, the unequal pitch lengths can be "randomized" into a pattern in the chain. Randomization will alter the pattern of contacts between the chain and sprocket and provide a modification of the noise spectrum generated by the chain and sprocket contacts.

The effective lengths of the links can also be changed by varying the distance between the apertures of the links. Thus, while the link plates are maintained the same length, the distance P, shown in FIG. 4, between the apertures is altered between links in the chain. Again, such alteration will alter the pattern of chain and sprocket contacts and the resulting noise spectrum. Variation can also be achieved by altering the vertical location of one of the apertures with respect to the other aperture in the link. Thus, in FIG. 4, aperture 50 could be located at a different vertical location in link plate 18 than aperture 51.

The effective lengths of the links can also be changed by varying the size and configuration of the rollers. By changing the diameters of the rollers, the effective length of the chain is altered. As shown in FIG. 5, roller 52 has a different diameter than roller 53. Thus, roller 52 will seat in the root of the sprocket at a different location than roller 53. The different seating provides a different distance R from the center of the sprocket to the center of the roller 52 than the distance R' from the center of the sprocket to the center of the roller 53. The different distances R and R' alter the effective pitch of the links. As shown in FIG. 51, roller 53 will contact the sprocket along the side of the tooth 36, rather than in the root 39 of the sprocket. Such a roller should eventually seat in the root of the sprocket.

In addition to varying the diameter of a substantially circular roller, the configuration of the roller can also be altered. For example, FIG. 7 illustrates an elliptical roller 54 and FIG. 8 illustrates a triangular roller 56. Other shapes and sizes of rollers are possible, all of which are within the scope of this invention. The variation in rollers bushings in the rollerless chain shown in FIG. 2, where the bushings directly contact the sprocket teeth. Thus, for example, the bushings 30 can be elliptical or triangular in the same manner as the rollers 54, 56.

Variation can also be achieved by modification of the pins or the bushings. The diameter of the pins can be increased. For example, in FIG. 6, the diameter of pin 24 differs from the diameter of pin 44. The outer diameter of the bushings can also be increased. The bushings can also be altered by providing an eccentrically mounted bushing on certain links. The eccentric mounting is achieved by making the cross section of the aperture of the bushing off-center. Such an eccentric mounting will change the effective pitch of the links.

The present invention also has application to chains of multiple rows, including double row and triple row chain. FIG. 9 shows an example of a double row chain. In this embodiment, an additional outer link plate 17 is provided in conjunction with outer link plates 16, 18. The variation techniques described above are utilized in conjunction with various links of the multiple row chain. The variation techniques described above may also be utilized with a standard sprocket, having teeth equally spaced around the periphery of the sprocket, or with a modified sprocket, having unequally spaced teeth.

In operation, the chain of the present invention modifies the pattern of contacts of the chain with the sprocket. By variation of the effective pitch of the chain, through modification of link lengths or roller sizes and configurations, or a combination of the above, the pattern of impacts of the links with the sprocket is altered. Some links will impact the sprocket teeth with the rollers at a point along the side of the sprocket teeth. Other links will impact the sprocket teeth in the root between the sprocket teeth. Modification of the chain in the described manner will result in an alteration of the pattern of contacts which will alter the noise spectrum for the chain.

Use of a roller chain constructed in accordance with the teachings of this invention with a sprocket results in the generation of a noise pattern that is modified in comparison with the noise pattern generated by a chain and sprocket in which all the links are of identical pitch length. The chain of this invention is suitable for use with a variety of sprocket tooth forms, including sprockets with dual teeth. The modifications can be utilized in various combinations, such as larger rollers with unequal length links, or elliptical rollers with shorter and longer inside links.

While several embodiments for the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A chain for use with a sprocket, said chain having a series of interleaved inner links and outer links;
   each outer link having a pair of outer link plates fixedly mounted to spaced pin members;
   each inner link having a pair of bushings mounted to turn on said pins of said outer links, said inner links having inner link plates fixedly mounted to said bushings;
   a roller mounted to turn on each bushing and adapted to contact the teeth of a sprocket;
   each of said inner links and said outer links being adapted to receive a sprocket tooth;
   some of said rollers having a first configuration and others of said rollers having a second configuration, said second configuration being different from said first configuration.

2. The chain of claim 1 wherein said first and second roller configurations are substantially circular, said first configuration being defined by a first diameter and said second configuration being defined by a second diameter.

3. The chain of claim 1 wherein said first configuration is substantially circular.

4. The chain of claim 1 wherein said first configuration is substantially elliptical.

5. The chain of claim 1 wherein said first configuration is substantially triangular.

6. A chain for use with a sprocket, said chain having a series of interleaved inner links and outer links;
   each outer link having a pair of outer link plates fixedly mounted to a pair of spaced pin members;
   each inner link having a pair of bushings mounted to turn on said pins of said outer links, said inner links having a pair of inner link plates fixedly mounted to said bushings;
   each bushing being adapted to contact the teeth of a sprocket;
   each of said inner links and said outer links being adapted to receive a sprocket tooth;
   some of said links having a pitch length of a first fixed distance and others of said links having a pitch length of a second fixed distance, said second fixed pitch length distance being different from said first fixed pitch length distance;
   said links of said first fixed pitch length distance are randomly arranged with said links of said second fixed pitch length distance.

7. The chain of claim 6 wherein some of said links have inner link plates of a first fixed length and others of said links have inner link plates of a different fixed length.

8. The chain of claim 6 wherein some of said links have outer link plates of a first fixed length and others of said links have outer link plates of a different fixed length.

9. The chain of claim 6 wherein some of said links have said pin members spaced apart a first fixed distance and others of said links have said pin members spaced apart a different fixed distance.

10. The chain of claim 6 wherein some of said pin members have a first diameter and others of said pin members have a different diameter.

11. The chain of claim 6 wherein said links of said first fixed pitch length distance are arranged in a prescribed pattern with said links of said second fixed pitch length distance.

12. A chain for use with a sprocket, said chain having a series of interleaved inner links and outer links;
   each outer link having a pair of outer link plates fixedly mounted to spaced pin members;
   each inner link having a pair of bushings mounted to turn on said pins of said outer links, said inner links having inner link plates fixedly mounted to said bushings;
   each bushing being adapted to contact the teeth of a sprocket;
   each of said inner links and said outer links being adapted to receive a sprocket tooth;
   some of said links having a pitch length of a first distance and others of said links having a pitch length of a second distance, said second pitch length distance being different from said first pitch length distance;
   some of said bushings have a first configuration and others of said bushings have a different configuration.

13. The chain of claim 12 wherein said first and second bushing configurations are substantially circular, said first configuration being defined by a first diameter and said second configuration being defined by a second diameter.

14. The chain of claim 12 wherein said first configuration is substantially circular.

15. The chain of claim 12 wherein said first configuration is substantially elliptical.

16. The chain of claim 12 wherein said first configuration is substantially triangular.

17. The chain of claim 12 wherein said first configuration comprises said bushing being eccentrically mounted on said pin members.

18. A chain for use with a sprocket, said chain having a series of interleaved inner links and outer links;
   each outer link having a pair of outer link plates fixedly mounted to spaced pin members;
   each inner link having a pair of bushings mounted to turn on said pins of said outer links, said inner links having inner link plates fixedly mounted to said bushings;
   each of said inner links and said outer links being adapted to receive a sprocket tooth;
   some of said links having a pitch length of a first fixed distance and others of said links having a pitch length of a second fixed distance, said second fixed pitch length distance being different from said first fixed pitch length distance;
   said links of said first fixed pitch length distance are randomly arranged with said links of said second fixed pitch length distance;
   said chain includes a roller mounted to turn on each bushing, said roller being adapted to contact the teeth of a sprocket.

19. The chain of claim 18 in combination with a sprocket, said sprocket having a series of teeth equally spaced around its periphery,
   some of said rollers of said chain having a first configuration and others of said rollers having a different configuration.

20. The chain and sprocket combination of claim 19 wherein said sprocket has some pairs of teeth spaced apart by a first distance and other pairs of teeth spaced apart by a second distance.

21. The chain of claim 18 wherein said links of said first fixed pitch length distance are arranged in a prescribed pattern with said links of said second fixed pitch length distance.

22. The chain of claim 18 wherein some of said links have inner link plates of a first length and others of said links have inner link plates of a different length.

23. The chain of claim 18 wherein some of said links have outer link plates of a first length and others of said links have outer link plates of a different length.

24. The chain of claim 18 wherein some of said links have said pin members spaced apart a first distance and others of said links have said pin members spaced apart a different distance.

25. The chain of claim 18 wherein some of said pin members have a first diameter and others of said pin members have a different diameter.

26. A chain and double sprocket combination, said chain having a series of sets of outer links, each of said sets being interleaved with an inner link;

each outer link having a pair of outer link plates fixedly mounted to spaced pin members;

each outer link having a pair of bushings mounted to turn on said pins of said outer links, said inner link having an inner link plate fixedly mounted to said bushings;

a roller mounted to turn on each bushing and adapted to contact the teeth of a sprocket;

said outer links being adapted to receive a sprocket tooth between them;

some of said sets of links having a pitch length of a first distance and others of said sets of links having a pitch length of a second distance, said second pitch length distance being different from said first pitch length distance;

said links of said first pitch length distance are randomly arranged with said links of said second pitch length distance;

said sprocket having a plurality of rows of teeth extending about is periphery.

* * * * *

UNITED STATES PATENT AND TRADEMARK OFFICE
CERTIFICATE OF CORRECTION

PATENT NO. : 5,192,252

DATED : March 9, 1993

INVENTOR(S) : John C. Skurka et al.

It is certified that error appears in the above-indentified patent and that said Letters Patent is hereby corrected as shown below:

<u>On the Title Page</u>

In line 2 of the "Inventors" information, please delete "Rochester" and substitute --Dryden--.

<u>In the Detailed Description of the Drawings</u>

In column 5, line 19, delete the first occurrence of "a".

In column 6, line 2, delete "51" and substitute --5--.

In column 6, line 12 after "rollers" insert --which has been described can also be applied to the--.

UNITED STATES PATENT AND TRADEMARK OFFICE
CERTIFICATE OF CORRECTION

PATENT NO. : 5,192,252
DATED : March 9, 1993
INVENTOR(S) : John C. Skurka et al.

It is certified that error appears in the above-indentified patent and that said Letters Patent is hereby corrected as shown below:

<u>In the Claims</u>
Col. 10, line3
    In claim 26, line 6, delete "outer" and substitute --inner--.
Col. 10, line 20
    In claim 26, line 23, delete "is" and substitute --its--.

Signed and Sealed this

Twenty-second Day of October, 1996

Attest:

BRUCE LEHMAN

*Attesting Officer*    *Commissioner of Patents and Trademarks*